Aug. 25, 1959 J. R. STOVALL, JR 2,901,737

DISK RECORDING COMPENSATING DEVICES

Filed Nov. 1, 1955

INVENTOR.
JOHN REED STOVALL, JR.
BY
Charles E. English
AGENT 2,901,737

DISK RECORDING COMPENSATING DEVICES

John Reed Stovall, Jr., Mount Airy, Pa., assignor to Sperry Rand Corporation, New York, N.Y., a corporation of Delaware Application November 1, 1955, Serial No. 544,256

12 Claims. (Cl. 340—174)

Figure 1:
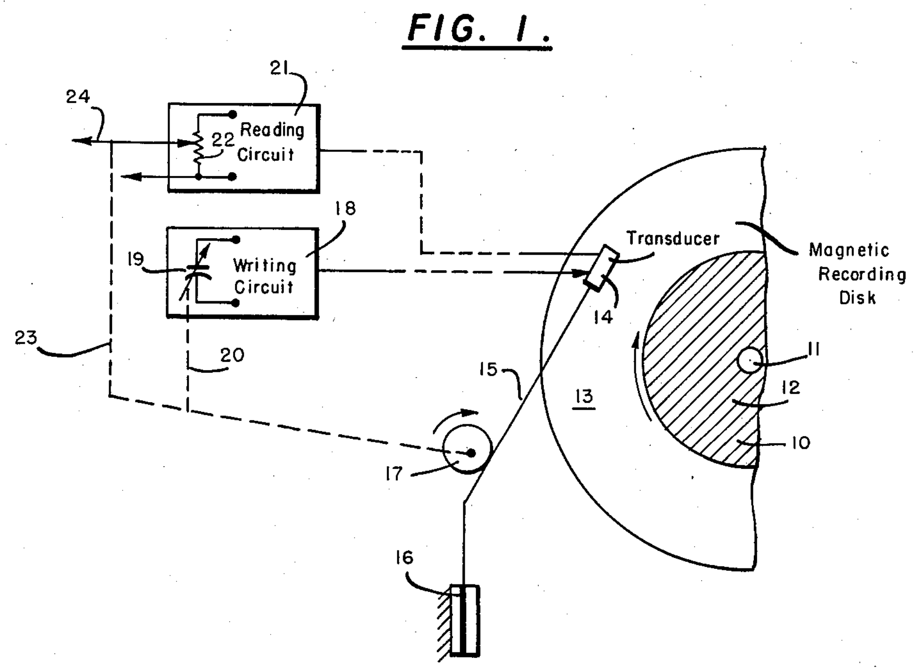

The present invention relates to recording systems, for instance of the type capable of utilization as a random access automatic data storage system in electronic computers; and is more particularly concerned with magnetic disk-type stores wherein greater amounts of information may be stored on an individual disk and wherein information so stored may be read with a more constant amplitude than has been the case heretofore.

A random access automatic data storage system may comprise, for instance, a plurality of circular metallic disks spaced from one another on a common shaft whereby data magnetically recorded on the surfaces of such disks may be selectively accessible to read-record heads mounted on movable scanning arms. Such a random access automatic data storage system is described, for instance in the copending application of John Presper Eckert, Jr., H. F. Welsh, N. J. Appleton, and M. Silverberg, Serial No. 485,746, field February 2, 1955, for: "Recording Apparatus," which copending application has been assigned to the assignee of the instant application.

Disk stores of the type taught in the identified copending application, as well as of the types to be described subsequently, ordinarily present greater recording areas per unit volume than other forms of stores such as magnetic drums; and in operation, a scanning arm with two read-record heads, mounted back-to-back for instance, need only move to a selected space between two adjacent disks, and then from an edge inward on a disk to read or record information at predetermined locations on the disk employed for storage. The sweep of the scanning arm may describe a continuous spiral on the surface of the revolving disk, in which event the operation of the system is analogous to that of an ordinary record player. In the alternative, however, concentric circle tracking may be employed by regularly stepping the scanning arm, such that the discrete stepping of the scanning arm permits reiteration of recorded data.

It has been found that by the very nature of the disk type store, a number of problems arise in the recording and reading of information, particularly if the entire radius of a given disk is employed for storage purposes. It will be appreciated that, as a recording head moves from the edge of a rotating disk towards the center of such a disk, the linear velocity of the disk surface past the head decreases. This change in relative velocity, as a head moves toward the center of the disk, is accompanied by at least two distinct disadvantages. First, information stored adjacent the periphery of the disk tends to have a greater amplitude, when read, than information stored closer to the center of the disk even though the signal amplitudes of information stored at such differing locations were initially the same. Second, and perhaps even more significantly, it will be appreciated that, in addition to the foregoing change in signal strength with changes in relative velocity between a recording medium and a magnetic transducer, the pulse density of signals recorded on the disk will tend to vary as the head is moved to different locations on the disk, if a constant frequency signal source is employed. In such a constant frequency system, the pulse density on the disk is accordingly limited by the response of the information channel having the smallest diameter, and this limitation on permissive pulse density accordingly results in information being recorded adjacent a periphery of the disk at a much lower density than would otherwise be possible, with a resultant inefficiency in recording.

The present invention serves to obviate the foregoing difficulties in existing disk-type storage systems by so controlling a read-record head associated with a magnetic disk that, as the head moves from the periphery of the disk toward the center thereof with an attendant decrease in relative velocity between the head and disk, the frequency of information recorded on the disk is reduced, thereby to maintain a substantially constant pulse density throughout the recording area of the disk. In the converse, it will be seen that as the head is moved toward the periphery of the disk from a location closer to the center thereof, the frequency of information to be recorded is increased, whereby a higher pulse density is achieved adjacent the periphery of the disk than was possible in constant frequency pulse systems employed heretofore.

The present invention further contemplates the control of a magnetic transducer during a reading operation whereby a variable impedance is coupled to the transducer output. This impedance is so varied with respect to variations in location of a ransducer on a magnetic storage disk that the amplitude of information read remains substantially constant, or, in the alternative, compensation is made for possible alterations to the information being read which alterations may be caused by variations in relative velocity between disk and head, regardless of the position of the transducer on the disk.

It is accordingly an object of the present invention to provide an improved magnetic storage unit.

A further object of the present invention resides in the provision of a disk-type storage system having more efficient operation than has been the case heretofore.

A further object of the invention resides in the provision of an improved magnetic disk-type storage system for the storage of pulse-type information wherein a substantially uniform pulse density is effected during the storage of information.

Another object of the present invention resides in the provision of a disk-type storage unit wherein possible deleterious variations in pulse density or signal strength, due to variations in relative velocity between a disk and a transducer associated therewith, are overcome.

A still further object of the present invention resides in the provision of an improved disk-type storage system capable of storing information more efficiently than has been the case heretofore.

Figure 2:
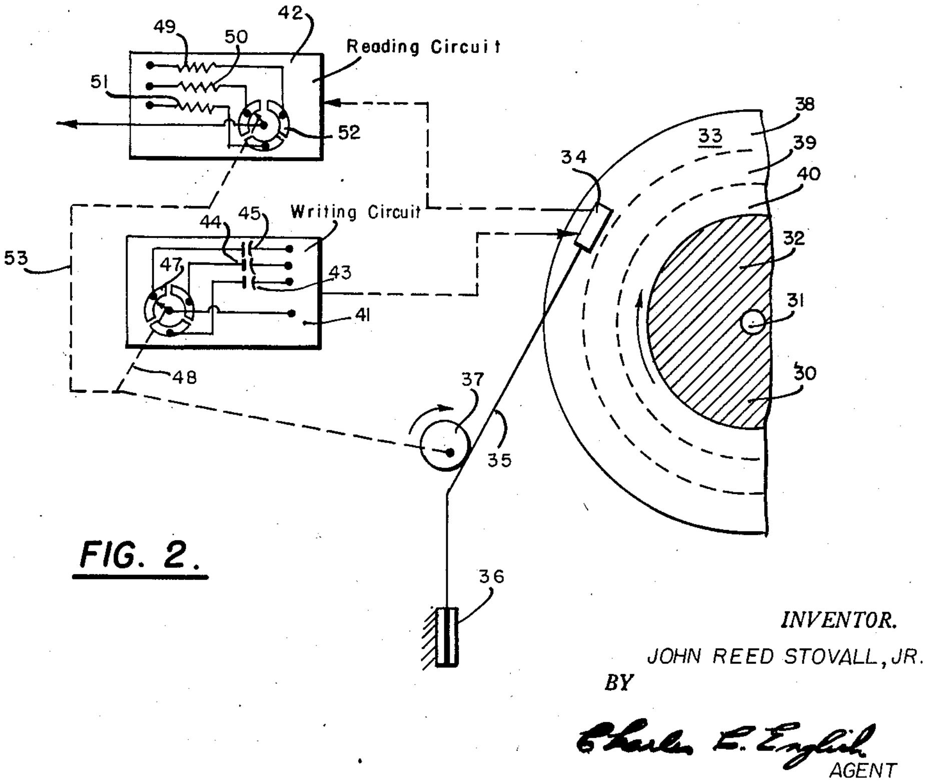

The foregoing objects, advantages, construction and operation of the present invention will becomes more readily apparent from the following description and accompanying drawings, in which:

Figure 1 illustrates a disk-type storage unit constructed in accordance with one embodiment of the present invention; and Figure 2 illustrates a further disk-type storage unit constructed in accordance with another embodiment of the present invention.

As mentioned previously, a disk-type storage unit may comprise a rotating disk cooperating with a scanning arm carrying a read-record head adjacent a storage surface of the disk. As the recording head is moved from the edge of such a disk toward the center thereof, the linear velocity of the disk surface past the head decreases and the head output also decreases. At a halfway point, that is a point disposed substantially halfway between the periphery and center of the disk, the relative linear velocity between the head and disk is half of its peripheral value, and at the center of the disk this relative velocity falls to zero.

If a constant pulse frequency is employed in the recording of information, the pulse density will vary continuously over the entire recording surface, resulting in less than optimum use of the recording surface, particularly adjacent the periphery of this surface. The present invention contemplates the compensation of this variation in pulse density by continuously decreasing the pulse frequency coupled to a transducer as the transducer approaches the center of a recording disk. By decreasing the pulse frequency as the relative linear velocity between disk and transducer decreases, a constant and optimum pulse density may be obtained. The present invention further contemplates the compensation of possible variations in signal strength due to changes in relative velocity between the head and disk, by coupling an output circuit to a transducer, which output circuit has a selectively variable impedance, the magnitude of which is responsive to the position of the transducer adjacent the disk.

It should be noted that as a transducer moves from the periphery toward the center of the disk, the problem of compensating for signal strength and pulse density variations becomes more and more severe as the transducer comes closer and closer to the center of the disk. It has been found that the inner one-half of a disk radius describes an area wherein the problems of compensation are far in excess of the advantages achieved by utilizing the recording area presented thereby. This inner one-half radius in effect describes a recording area equal to but one-fourth of the entire recording surface; and it is therefore contemplated, in accordance with the present invention, to record information only on that recording area generated by the outer one-half radius of the disk and representing substantially three-quarters of the entire disk area.

It should further be noted that in recording on this outer three-quarter area portion, records may be effected in a plurality of defined zones, in which event the compensating techniques, to be described, may be achieved in a step-by-step relation as the head moves from zone to zone. In the alternative, the entire three-quarter area of the disk utilized as a recording surface may be unzoned, in which event the compensation may be continuously performed. Other variations will, of course, be suggested. For instance, when the recording surface is divided into discrete zones, each such zone may cooperate with a separate read-record head operatively restricted to its particular zone, in which event the compensation methods to be discussed will comprise a switching technique wherein an output circuit of appropriate impedance, or a writing circuit of appropriate frequency, is selectively switched to a preselected read-record head coacting with a given zone of recording.

The foregoing possible variants of the present invention will be more readily seen by an examination of the several figures. Thus, referring to Figure 1, which is illustrative of a disk-recording system utilizing a disk having an unzoned recording area, it will be seen that a storage unit may comprise a recording disk 10 mounted for rotation around a central axis 11 and including an inner one-fourth, 12, of the total surface area which is unrecorded and an outer three-fourths, 13, of the total surface area adapted to store pulse-type information magnetically. The recording area 13 cooperates with a read-record magnetic transducer 14 mounted on a scanning arm 15 and the scanning arm, for instance, may be anchored at one end in a fixed structure 16 and may be caused to selectively scan over the recording surface 13 by rotation of a cam 17 mounted adjacent the scanning arm 15. The particular scanning arrangement comprising elements 15, 16 and 17, is illustrative of one possible scanning structure only; and is generically meant to be illustrative of other scanning devices causing the transducer 14 to describe either a continuous spiral on the recording surface 13 or to describe, by stepping action, a plurality of concentric circles. One alternative in the possible scanning structure which may be employed is described in the aforementioned and identified copending application Serial No. 485,746.

The transducer 14 is selectively energized by a writing circuit 18 which may take any known form of signal generator capable of providing information to be recorded; and possible writing circuits of the type which may be employed are well known to those skilled in the art. In general, the writing circuit 18 may include a reactance network defining the frequency of operation of the circuit 18; and in accordance with the present invention, this reactance network is selectively variable thereby to vary the frequency of output from writing circuit 18. The possible variation in the reactance network of circuit 18 is diagrammatically illustrated in the arrangement of Figure 1 by a continuously variable capacitor 19 which capacitor may, for instance, be included in the grid circuit of the writing generator; and the movable element of capacitor 19 is coupled to cam 17 by a linkage 20 whereby the output frequency of circuit 18 varies during the scanning of transducer 14 over the surface 13. As mentioned previously, this frequency variation is preferably such that the frequency output of circuit 18 decreases as transducer 14 is caused to approach the center of disk 10 thereby to maintain a substantially constant pulse density throughout the recording area 13.

The transducer 14 is also coupled to a reading or output circuit 21 which includes a variable impedance 22—24 coupled via a linkage 23 to the aforementioned cam 17. It will be appreciated that, in practice, a read-write switch will ordinarily be disposed between the output of writing circuit 18 and the input of transducer 14 and between the output of transducer 14 and the input of reading circuit 21; and such switches are well known in the art. During a reading operation, at which time the transducer 14 serves to detect information stored as magnetic gradients in the recording area 13, the output impedance of circuit 21 is so varied that output signals read, for instance at point 24, have a substantially constant and predetermined signal strength regardless of the position of transducer 14 on the recording surface 13. In practice, the impedance 22 may comprise a portion of potentiometer 22—24, and the signal strength at point 24 is held constant by varying the voltage divider ratio on potentiometer 22—24 as the voltage across 22 varies with the tranducer position. The particular variable impedance 22—24 is meant to be illustrative only of many possible arrangements which may be employed, and may for instance comprise a variable bias source coupled to a limiter amplifier. Similarly, the capacitor 19 is meant to be illustrative of other forms of variable impedance which may be employed and may be replaced, for instance by a variable inductance or variable resistance, depending upon the particular form of writing generator employed.

As mentioned previously, recording may be effected in a pluarity of zones on an over-all recording area, in which event the compensating techniques described may be practiced in a step-by-step relation as the transducer moves from zone to zone. Thus, referring to Figure 2, it will be seen that in accordance with another embodiment of the present invention, a recording disk 30 may once more be mounted for rotation around a central shaft 31, and may include an unrecorded central one-quarter area 32 and an outer three-quarter recording area 33. As before, the rotating storage disk 30 cooperates with a magnetic transducer 34 mounted on a scanning arm 35 attached at one end to a base structure 36 and the arm 35 and transducer 34 may be caused to scan over the recording surface 33 by a rotating cam 37. In the particular example illustrated in Figure 2, it has been assumed that the recording area 33 has been divided into a plurality of predetermined recording zones 38, 39 and 40, illustrated by the dotted lines shown. When such a zone-type record is employed, information may be recorded in any one of the zones through the agency of a writing circuit or signal source 41 coupled, as shown, to the transducer 34. The information so stored may be read by a reading circuit via an output network 42, again coupled to the transducer 34. Once more, as mentioned previously, the writing circuit 41 and reading circuit 42 may be isolated from one another by a read-record switch of known construction.

Due to the zone-type recording and reading achieved in the embodiment illustrated in Figure 2, adequate compensation for both signal strength and pulse density variations may be effected by causing the output frequency of writing circuit 41, and the output impedance of reading circuit 42, to be varied in a step-by-step relationship as the transducer moves from zone to zone. Thus, the writing circuit 41 may include a plurality of discretely different impedances represented, for instance, by capacitors 43, 44 and 45; and these impedances may be selectively utilized to control the frequency of writing circuit 41 through the agency of a rotary switch 47, the arm of which is coupled via a linkage 48 to the rotating cam 37. As before, the capacitors 43, 44 and 45 may be utilized to vary a reactance network comprising the writing generator of circuit 41 and are meant to be generically illustrative of other forms of impedances which may be so employed. Similarly, while a rotary switch 47 has been shown for the switching of a preselected one of the impedances 43 through 45 into the writing circuit, other forms of switches, for instance electronic in nature, may be employed.

In practice, as before, the output frequency of writing circuit 41 is changed as the transducer 34 moves over the recording surface 33; and in the particular example illustrated, this change is in a step-by-step relationship whereby the highest output frequency is effected by circuit 41 when the transducer operates in zone 38; a somewhat lower frequency is effected by the said circuit 41 when the transducer 34 operates in zone 39; and a still lower frequency output is effected by circuit 41 when the transducer operates in zone 40.

Again, by analogy, the transducer 34 is selectively coupled to a reading or output circuit 42 during read-out operations; and this reading circuit 42 again comprises a plurality of impedances 49, 50 and 51 having discretely different magnitudes. Which of the impedances 49 through 51 is switched into the output circuit comprising circuit 42, is controlled by a rotary switch 52, the rotating arm of which is coupled to cam 37 by a linkage 53; and as before, an output impedance of higher and higher magnitude is switched into the circuit as the transducer 34 moves from zone 40 to zone 39 and thence to zone 38.

The arrangements thus described in reference to Figures 1 and 2 achieve compensation for both possible variations in pulse density and possible variations in signal strength. It should be noted, of course, that the arrangements so described encompass other possible recording systems of the disk-type; and in particular, an arrangement such as has been illustrated in Figure 2 may be modified to include a separate read-record transducer associated with each of the zones 38, 39 and 40 respectively. In such a case, the step-by-step switching arrangement illustrated in Figure 2 may be utilized by selectively switching the appropriate impedance into an input or output circuit in dependence upon which of the several read-record heads is being employed for the writing or detection of information. Similarly, a continuously variable compensation system of the type illustrated in Figure 1 may be associated with each of the several read-record heads employed in a zone-type record of the type shown in Figure 2 thereby to permit a continuous compensation during operation in each recording zone. Combinations of the step-by-step and continuous variation techniques may also be employed in such a multiple head structure.

It should further be noted that the present invention contemplates other forms of compensation than those already described. Thus, as described in the above identified copending application Serial No. 485,746, a read-record transducer such as 14 or 34 is ordinarily caused to float on a film of air over the rotating disk surface, such as 10 or 30, during reading and recording operations; and this floating action is ordinarily controlled by a resilient member such as a spring coupled to the transducer. In practice, it will be appreciated that the amplitude of signals recorded and read by a transducer, such as 14 and 34, is proportional to the relative spacing between such a transducer and the rotating disk; and because of the air film floating action described, the decrease in relative velocity between the transducer and disk, as the said transducer moves toward the center of the disk, in turn tends to decrease the air film between the transducer and disk whereby the spacing between transducer and disk tends to decrease as the transducer approaches the center of the disk.

This further factor, which may engender a still further possible variation in signal strength, can also be compensated for in accordance with the present invention by maintaining constant the spacing between the head and the disk as the head approaches the center of the disk. This particular form of compensation may be effected, for instance, by varying the spring tension on the head under the control of the rotating cam, such as 17 or 37, or under the control of other forms of scanning devices which may be employed. Again, it will be noted that the decreased spacing between head and disk as the head approaches the center of the disk, tends to increase the signal strength, while the decrease in relative velocity between the head and the disk tends to decrease signal strength. The two possible variants thus provide some compensation for one another when an air floating type of head is employed; but even in such an event, the forms of variable impedance compensation described in reference to Figures 1 and 2 may be employed thereby to enhance the uniformity of read-out achieved in a disk recording system.

Still further variations will be suggested to those skilled in the art, and it must therefore be stressed that the foregoing discussion is meant to be illustrative only and is not limitative of my invention. All such variations as are in accord with the principles described are, therefore, meant to fall within the scope of the appended claims.

Having thus described my invention, I claim:

1. In a magnetic recording system, a magnetic recording medium, a magnetic transducer adjacent said medium, pulse producing means coupled to said transducer, said pulse producing means including a variable impedance control circuit, said variable control circuit being operative to define the repetition rate of the pulses supplied to said transducer by said pulse producing means, means effecting variable speed relative motion between said record medium and said transducer, and means responsive to variations in said relative speed for varying the impedance of said control circuit during a recording operation thereby to vary the repetition rate of pulses fed to said transducer.

2. The system of claim 1 including a variable impedance output circuit coupled to said transducer and responsive to pulse signals induced in said transducer, during a reproducing operation, by magnetic gradients in said recording medium, said variable impedance output circuit being separate from said variable impedance control circuit, and means for varying the impedance of said output circuit during a reproducing operation thereby to compensate for recorded signal amplitude variations effected by said variations in relative speed during such a reproducing operation.

3. The system of claim 1 wherein said recording medium comprises a magnetizable disk rotating at substantially constant speed, said means effecting variable speed relative motion between said medium and said transducer comprises means variably positioning said transducer between the periphery and the center of said disk.

4. In a magnetic recording system, a rotating disk-like magnetic record medium, a transducer mounted adjacent said record medium, positioning means coupled to said transducer for variably positioning said transducer over a predetermined restricted recording area disposed between the external periphery of said disk and a limiting location substantially half-way between said periphery and the center of said disk, input means supplying spaced pulses to said transducer thereby to record said pulses on said magnetic record medium, said input means including a variable impedance network for determining the repetition rate of said pulses supplied by said input means, and means responsive to the variations in the radial position of said transducer for varrying said impedance means to alter said repetition rate in the direction to assure a substantially uniform spacing of said pulses throughout said restricted recording area of said disk.

5. In a magnetic recording system, a rotating disk of magnetic material, a magnetic transducer mounted adjacent said disk, means causing said transducer to be radially positioned at different locations between the periphery and the center of said disk whereby the relative velocity between said transducer and disk varies as a function of the position of said transducer adjacent said disk, and means energizing said transducer with a plurality of pulse signals having a variable repetition rate, said energizing means including variable impedance means dependent upon the radial position of said transducer adjacent said disk for varying the repetition rate of said energizing pulse signals so that the density of the pulse signals magnetically stored on said disk remains substantially constant.

6. The system of claim 5 wherein said impedance is continuously varied as said transducer moves between the periphery and the center of said disk.

7. The system of claim 5 wherein said impedance is varied in a plurality of discrete steps as said transducer moves between the periphery and the center of said disk.

8. In a magnetic recording system, a rotating disk having a magnetic storage surface, a magnetic transducer adjacent said surface of said disk, means coupling spaced information pulses to said transducer, means causing said transducer to scan said surface of said disk at different positions between the periphery of said disk and the center of said disk whereby said transducer selectively stores pulse-type information on said disk, and means responsive to the scanning position of said transducer adjacent said disk for compensating for pulse density variations effected by variations in relative velocity between said transducer and said disk, said last named means comprising a variable impedance which varies the repetition rate of the input pulses in accordance with said transducer position so that compensation for pulse density variation is achieved whereby said pulse-type information is recorded at a substantially constant pulse density throughout said magnetic storage surface.

9. The system of claim 8 wherein said storage surface comprises a limited annular recording zone disposed between the periphery of said disk and radial locations substantially half way to the center of said disk.

10. In a magnetic reproducing system, the combination of a rotatable disk having a magnetic storage surface, a magnetic transducer adjacent said disk, means causing said transducer to scan said disk at different positions between the periphery of said disk and the center of said disk, means for supplying said transducer with a plurality of spaced information pulses having a variable repetition rate, variable impedance means included in said supplying means for changing said variable repetition rate whereby said information pulses are stored on said storage surface on said disk with a substantially constant pulse density throughout said storage surface, means responsive to the position of said transducer relative to said disk for varying said variable impedance, said transducer being responsive to said magnetic gradients in said disk thereby to reproduce said substantially constant density pulse-type information magnetically stored in said disk, and means coupled to said transducer and responsive to the scanning position of said transducer adjacent said disk for compensating for reproduced pulse amplitude variations effected by variations in relative velocity between said transducer and disk.

11. In an information recording and reproducing system, a movable magnetic storage surface, a magnetic transducer adjacent said storage surface, said transducer being operative to selectively record pulse-type information on said surface and reproduce said information previously recorded on said surface, means for moving said transducer to different locations adjacent said surface, control means including means for providing an impedance that varies in accordance with the relative velocity between said transducer and said surface and operative during a recording operation to compensate for pulse density variations effected by said changes in said relative velocity whereby said pulse-type information is recorded at a preselected substantially constant density at different positions on said storage means, and further control means including further means coupled to said transducer and operative during a reproducing operation for providing an impedance that varies with the relative velocity between said transducer and said storage surface to compensate for pulse amplitude variations effected by changes in said relative velocity whereby said pulse-type information is reproduced with a substantially constant amplitude.

12. In an information sensing system, a rotatable disk having a magnetic storage surface, a magnetic transducer adjacent said disk, input means connected to said transducer, output means conected to said transducer, means causing said transducer to scan said disk at different positions between the periphery of said disk and the center of said disk, said input means including means for supplying a plurality of information pulses to said transducer whereby said information may be placed on the magnetic surface of said disk, variable impedance means for controlling the rate of which said information pulses are supplied to said transducer, means coupled to said transducer and to said impedance and responsive to the position of said transducer relative to said disk to change said impedance in order that said pulses are recorded at a constant rate, said output means comprising further variable impedance means for controlling the output amplitude of said information pulses when detected by said transducer, said means responsive to said position of said transducer being coupled to said transducer and said further impedance to change said further impedance to compensate for amplitude variations in said output signals.

References Cited in the file of this patent

UNITED STATES PATENTS

| | | |
|---|---|---|
| 2,096,805 | Hickman | Oct. 26, 1937 |
| 2,239,042 | Kleber | Apr. 22, 1941 |
| 2,320,429 | Hasbrouch | June 1, 1943 |
| 2,326,564 | Rigby et al. | Aug. 10, 1943 |
| 2,379,707 | Hathaway | July 3, 1945 |
| 2,528,457 | Stone et al. | Oct. 31, 1950 |
| 2,800,642 | May | July 23, 1957 |
| 2,811,709 | Haselton et al. | Oct. 29, 1957 |